July 27, 1965

G. H. ERB 3,196,490

APPARATUS FOR MANUFACTURE OF A CONTINUOUS STRIP
OF MOLDED PLASTIC PRODUCT

Filed Nov. 14, 1961

July 27, 1965 G. H. ERB 3,196,490
APPARATUS FOR MANUFACTURE OF A CONTINUOUS STRIP
OF MOLDED PLASTIC PRODUCT
Filed Nov. 14, 1961 6 Sheets-Sheet 5

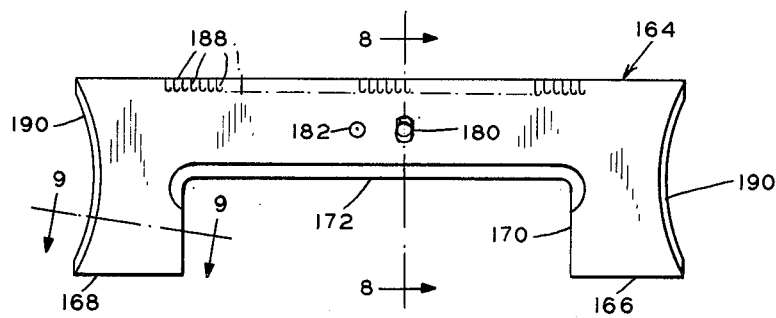
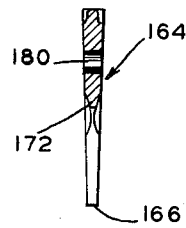
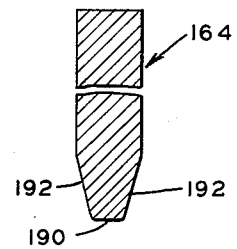
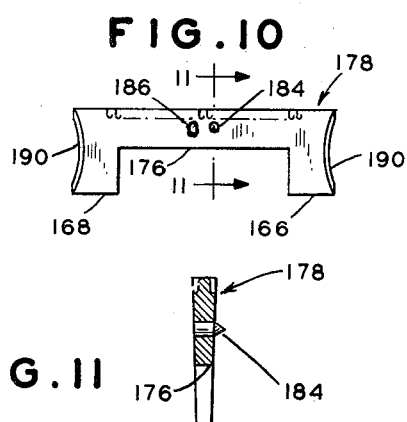
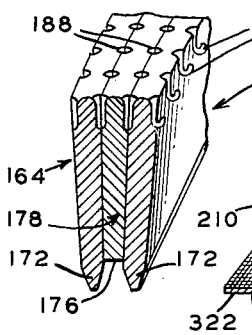
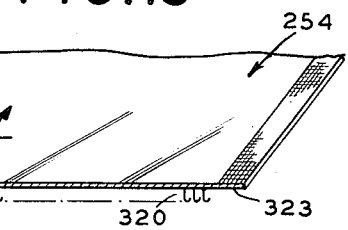
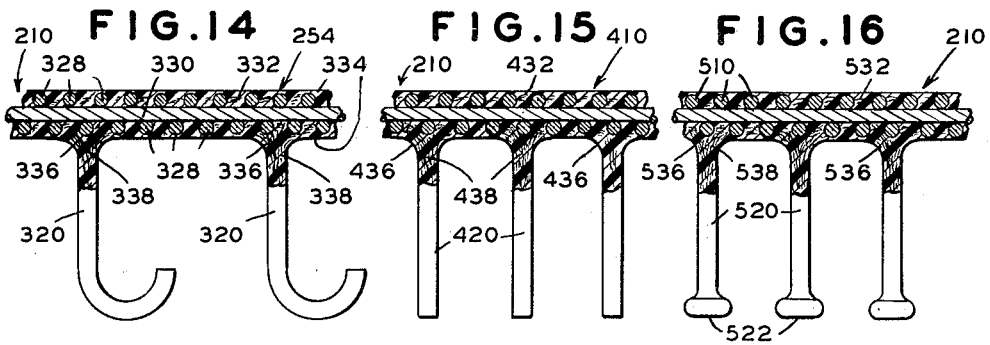

United States Patent Office 3,196,490
Patented July 27, 1965

3,196,490
APPARATUS FOR MANUFACTURE OF A CONTINUOUS STRIP OF MOLDED PLASTIC PRODUCT
George H. Erb, Fayson Lakes, N.J., assignor to Velok, Ltd., a corporation of Canada
Filed Nov. 14, 1961, Ser. No. 152,243
13 Claims. (Cl. 18—21)

The present invention relates to apparatus for the manufacture of molded plastic products. Illustratively the present invention may be utilized to manufacture molded continuous strips or ribbons of plastic material having integral formations projecting outwardly of the plane of the ribbon. One form of product manufactured in accordance with the present invention may have a configuration which resembles a pile fabric ribbon. The pile-like projections in such a product may comprise relatively straight tapered or non-tapered upstanding formations or they may comprise loops, hooks or knob-ended formations. The products differ from ordinary pile fabrics in that the base sheet and the pile-like formations are integrally molded. In a preferred form of the present invention a reinforcing strip such as a woven fabric, is incorporated into the molded base sheet as a result of forcing a moldable plastic material through the fabric from one side and injecting it from the other side of the fabric into an injection mold for the formation of the pile-like elements.

It is a particular feature of the present invention that the apparatus operates continuously to produce such ribbon-like products in indefinite lengths. A suitable plastic material in molten or other moldable form is continuously supplied to the machine under pressure to a pressure chamber communicating with constantly moving injection molding apparatus which in effect constitutes a series of two-part molds which are successively closed before entering the chamber. The closed molds are moved along a predetermined path through the chamber for a period of time sufficient to permit injection of the plastic material into the cavities of the molds and the formation of a relatively thin ribbon of plastic material which emerges from the chamber integrally connected with the formations molded in the cavities. The molds are then successively opened to permit withdrawal of the molded formations from the cavities by guiding the ribbon away from the opened mold-forming elements.

As an illustrative example of an embodiment of this invention there will be described an apparatus for forming a ribbon having a large number of closely spaced pile-like protuberances on one surface. Each protuberance is molded in the shape of a tiny hook having the outer end bent back toward the base from which it extends. This particular product, when provided with a very large number of very closely spaced, hook-shaped protuberances is useful as a fastening element in a fastener of the general type disclosed in U.S. Patent No. 2,717,437 to De Mestral. Obviously the pile elements thus molded may have other shapes as indicated above, and in general the present invention is of particular utility in connection with shapes which do not lend themselves to extraction from mold cavities formed, for example, in a solid block of metal. Also, it is of particular utility in the formation of protuberances which are long and very small in cross-section, and hence may be difficult to remove from solid molds and which may require cavities of such relatively great depth and small cross-section that factors such as entrapped air or premature solidification prevent proper filling of such cavities.

The present invention provides an apparatus in which a large number of relatively thin, essentially identical plates having flat faces are conducted transversely of their widths through a closed path, in one portion of which the plates are squeezed tightly together in face-to-face relation. The upper edge surfaces of the plates present a substantially continuous surface upon which a surface of the ribbon base may be formed. Mold cavities are formed in one or both faces of each plate so as to open into the upper edge surface of the plate. When the plates are squeezed together the substantially continuous surface mentioned above is broken only by the openings into the cavities along the lines of contact between contiguous plates. The plates are moved progressively beneath a source of liquid plastic material under substantial pressure to continuously force the plastic material onto the plate surfaces and into the cavities. The plates, still squeezed together, progress through a subsequent zone in which the plastic material solidifies, and then into a zone in which each plate is successively and individually accelerated away from the next succeeding plate to open the mold cavities, whereupon the ribbon with the molded protuberances may be continuously led out of the apparatus.

The separated plates may be conducted through a closed path of any desired shape to be returned to a point just ahead of the molding zone wherein they are successively brought into tightly squeezed relationship for a repetition of the cycle. The total number of plates required may be reduced substantially by providing a driving mechanism which moves the plates much more rapidly through the return zones of the path than they are moved through the molding zone. For mechanical simplicity it is preferred to provide a closed path of circular shape and in this event the plates should be accurately tapered in cross-section to fit together like wedges in the molding zone and thus to form a substantially solid "block" conforming to the circular path. If so desired the portion of the path extending through the molding zone may be rectilinear and the plates may be rectangular in cross-section to form a rectangular "block" in the molding zone.

The apparatus of the present invention may be used to extrude a solid web or ribbon of plastic material with integral injection-molded protuberances in which event the thickness of the base web or ribbon may be established and controlled by known extrusion techniques. However, in a preferred form of the apparatus the base web or ribbon may be continuously formed in a simple and accurately controlled manner by continuously supplying to the molding zone a preformed strip of suitably porous material through which the liquid plastic may be forced to enter the injection mold cavities. Inherently porous fabrics such as woven or non-woven fabrics made of natural, synthetic, or metallic fibers or yarns may be used, or non-porous or relatively non-porous materials such as paper, felt, sheet plastic or sheet metal may be perforated and used for the manufacture of products of various characteristics as desired. As indicated above, for the manufacture of separable fastener elements, a woven textile ribbon is preferred. In all such constructions the porous strip can be availed of to establish the desired thickness of the base web or ribbon, and it provides a multitude of passageways through which the liquid plastic may be forced to enter the moving injection mold cavities. When the plastic solidifies, it forms a continuous or integral structure within the pores of the porous strip encasing and impregnating the strip, and which is integrally united with the injection molded protuberances.

More specifically, fastener elements may be continuously formed from a thin, strong ribbon of woven cotton fabric similar, for example, to that used in the manufacture of cambric, and molten nylon supplied under pressure to the molding zone of the apparatus of the present invention. The molten nylon is forced through the fabric into the mold cavities to form the desired hooks or loops. The exit from the molding zone may include a lip pressing quite firmly upon the upper or back surface of the impregnated fabric whereby the fabric itself serves to meter the final thickness of the base strip or ribbon. Thus a thin flexible ribbon having great strength and durability is formed with firmly anchored hooks or loops projecting from one surface.

It is the object of the present invention to provide apparatus for the continuous manufacture of molded products similar to pile fabrics. Other and further objects will become apparent from the following detailed description of preferred forms of the present invention, taken in connection with the drawings forming a part of this specification.

In the drawings:

FIGS. 1 and 2 joined together along line A—A constitute a vertical sectional view of apparatus embodying the present invention, the section being central of the machine except that certain parts positioned in front of the plane of the section have been shown in fragmentary form;

FIGS. 3 and 4 joined together along line B—B constitute a vertical sectional view taken generally along the irregular line C—C in FIGS. 1 and 2, except that certain parts are shown in elevation in the lower portion of FIG. 4;

FIG. 7 is an elevational view of one of the mold forming plates;

FIG. 8 is a sectional view along the line 8—8 in FIG. 7;

FIG. 9 is an enlarged sectional view along the line 9—9 in FIG. 7;

FIG. 10 is a view similar to FIG. 7 but on a smaller scale and showing another mold-forming plate;

FIG. 11 is a sectional view along line 11—11 in FIG. 10, the scale in this view being the same as FIGS. 7 and 8;

FIG. 12 is an enlarged, fragmentary view showing the relative positions of two mold-forming plates of the type shown in FIG. 7 with one mold-forming plate of the type shown in FIG. 10 when the plates are pressed together in operative relation;

FIG. 13 is a top plan view on an enlarged scale, of a fastener element of one type that may be produced on the apparatus shown in FIGS. 1 through 12;

FIG. 14 is a fragmentary sectional view along the line 14—14 in FIG. 13; and

FIGS. 15 and 16 are views similar to FIG. 14 but showing illustrative modified forms of products which may be produced in accordance with the present invention.

Figure 1:
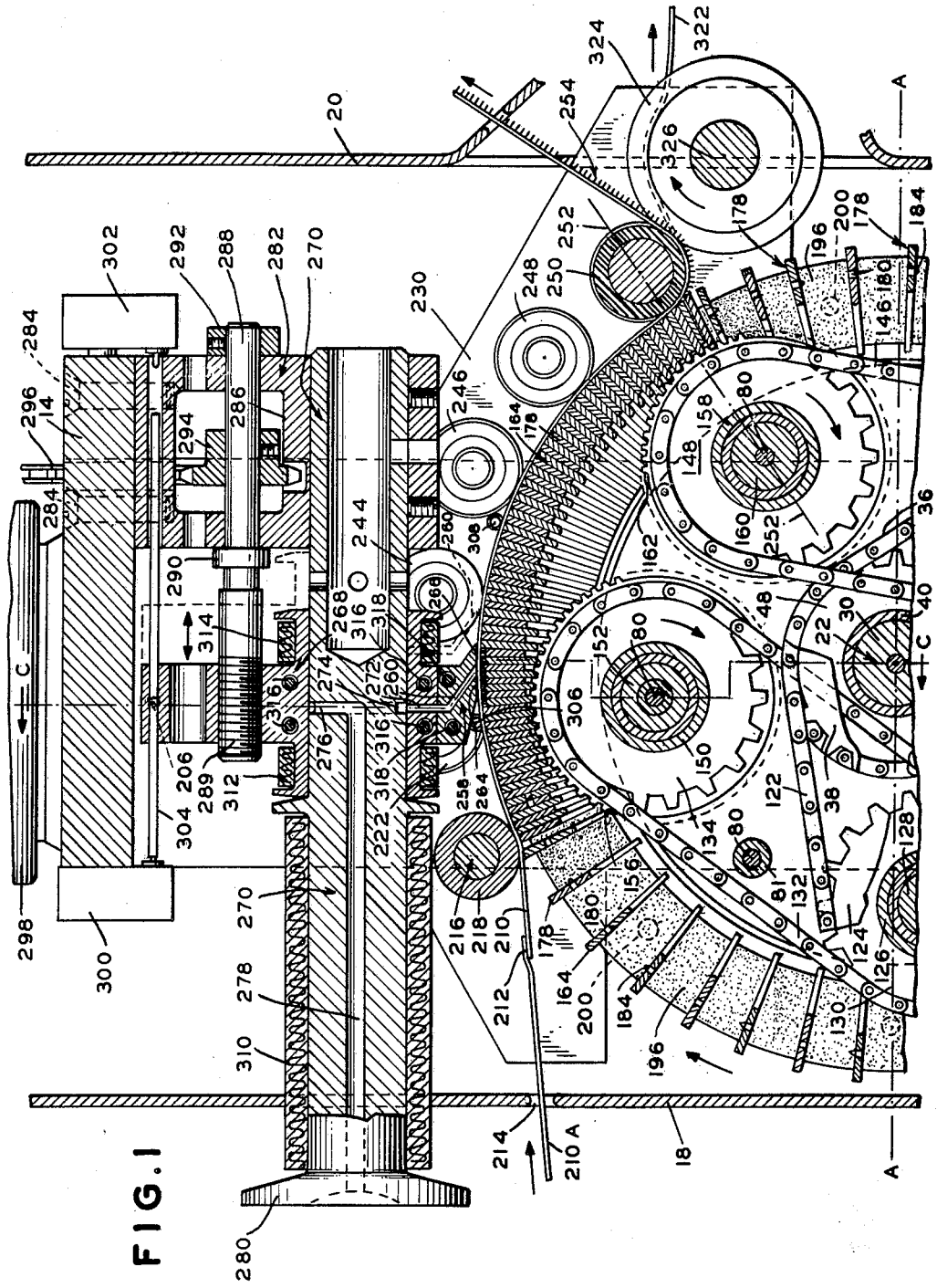
Figure 2:
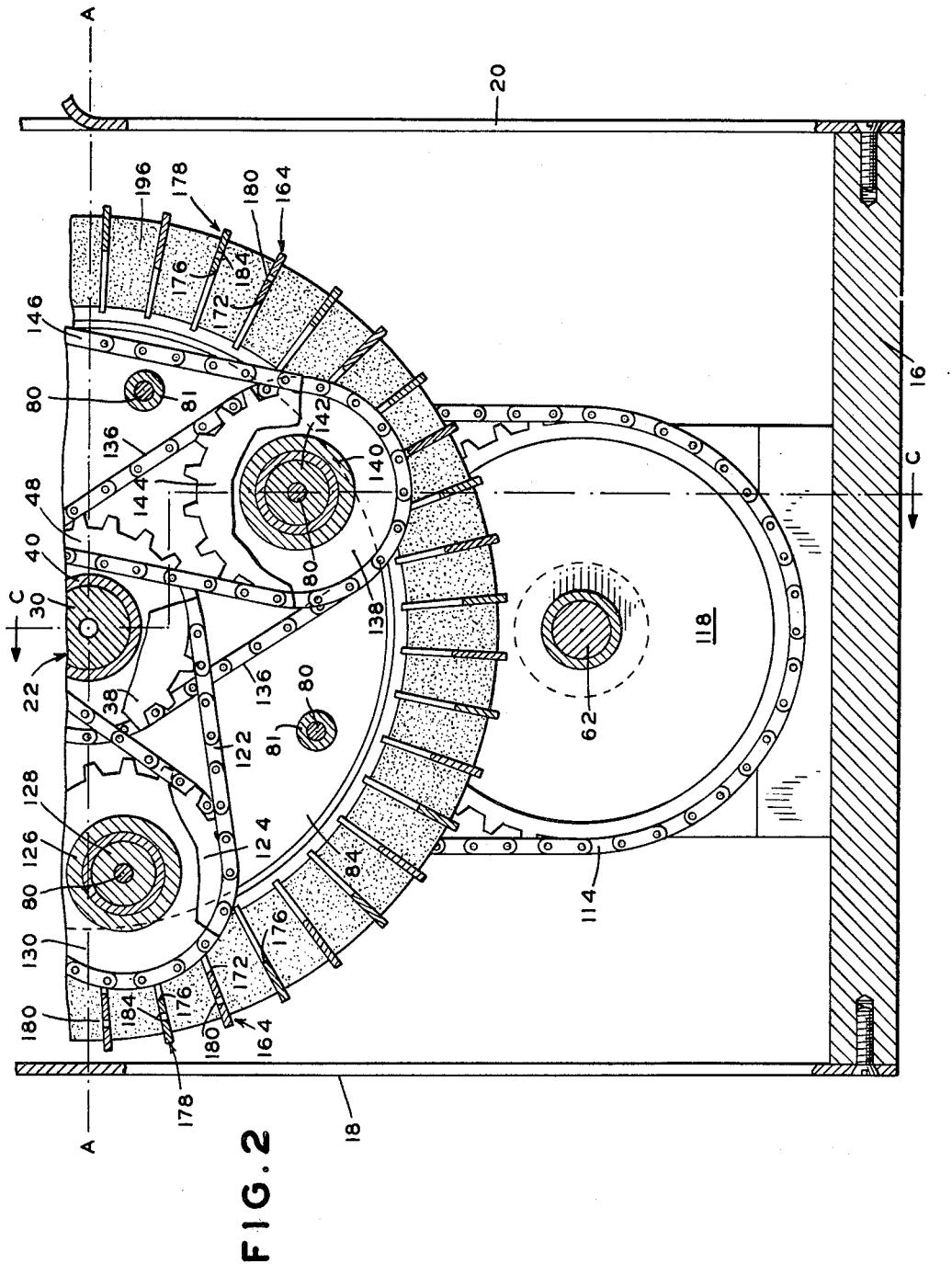

Referring now to the drawings, the continuous molding machine is generally enclosed within side walls 10 and 12, a bottom wall 16 (FIGS. 2 and 4) and rear and front walls 18 and 20 (FIGS. 1 and 2). As shown in FIG. 1 a top wall 14 encloses only a portion of the machine and a further enclosure or hood (not shown) is intended to be positioned above the wall 14 and between the rear and front walls 18 and 20 for such additional enclosure as may be desired.

The main drive shaft of the machine is shown at 22 in FIGS. 3 and 4 and it extends through suitable bearings which will be described hereinbelow, through the side walls 10 and 12. At the left-hand end of the shaft 22 as viewed in FIGS. 3 and 4, there may be secured any suitable form of drive pulley 24 for the purpose of imparting rotary motion to the shaft 22. The shaft 22 has a portion 26 of enlarged diameter which is rotatably received in a bearing 28, a portion 30 of reduced diameter located centrally of the machine and a portion 32 of further reduced diameter which extends beyond the right-hand side wall 12 of the machine. At its outer right-hand end the shaft 22 is milled longitudinally to receive a key 34 by which a worm wheel 36 is secured to the shaft 22 for rotation therewith. At the central portion 30 of the shaft 22 a sprocket 38 is secured, as by welding to the shaft 22 for rotation therewith. The portion 32 of the shaft 22 extends through a torque tube 40 which is rotatable relative to the shaft 22 and which is carried in a suitable bearing 42. The torque tube 40 is milled at its right-hand end as viewed in FIGS. 3 and 4 to receive a key 44 which serves to secure a sprocket carrying housing 46 to the torque tube 40 for rotation therewith. At its inner end the torque tube 40 has secured thereto, as by welding, a sprocket 48.

Figure 5:
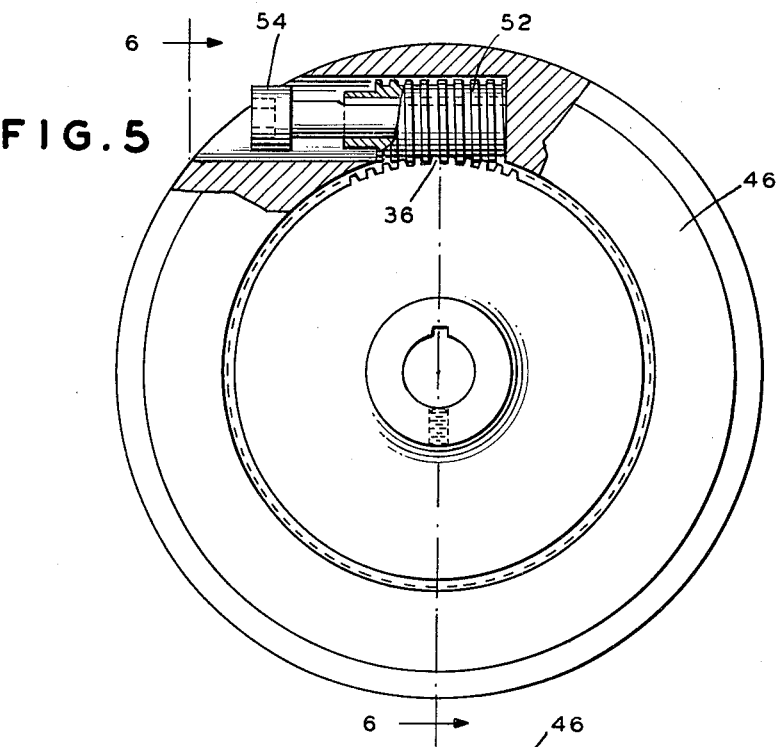
FIG. 5 is an elevational view, with parts in section, of an adjustable sprocket carried by the main shaft of the machine.
Figure 6:
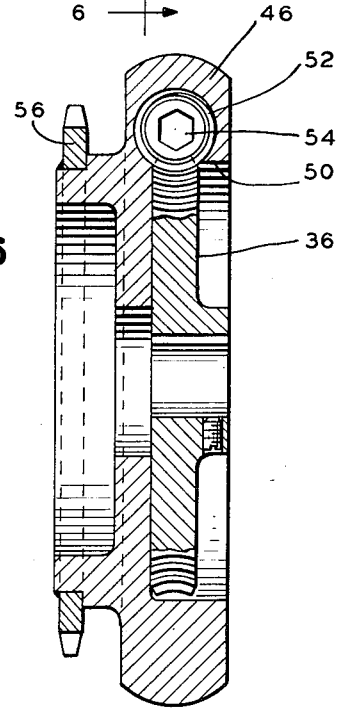
FIG. 6 is a sectional view along the irregular line 6—6 in FIG. 5.

Referring now to FIGS. 5 and 6, the housing 46 is provided with a recess 50 to receive the worm wheel 36 and it is provided with a worm 52 engageable with the teeth of the worm wheel 36. The worm 52 is adapted for rotation about its longitudinal axis by actuation of an adjusting head 54. Rotation of the main shaft 22 which is directly imparted to the worm wheel 36 will be transmitted to the housing 46 through the engagement of the teeth of worm wheel 36 with the worm 52 and actuation of the adjusting head 54 to rotate the worm 52 will be effective to alter the angular relationship between the housing 46 and the shaft 22. Thus, since the housing 46 is keyed to the torque tube 40 (FIG. 3) the sprocket 48 will be driven at the same angular speed as the shaft 22 and the sprocket 38, but the angular relationship between sprocket 48 and sprocket 38 may be changed to different fixed but adjustable positions for a purpose to be described hereinbelow.

Figure 3:
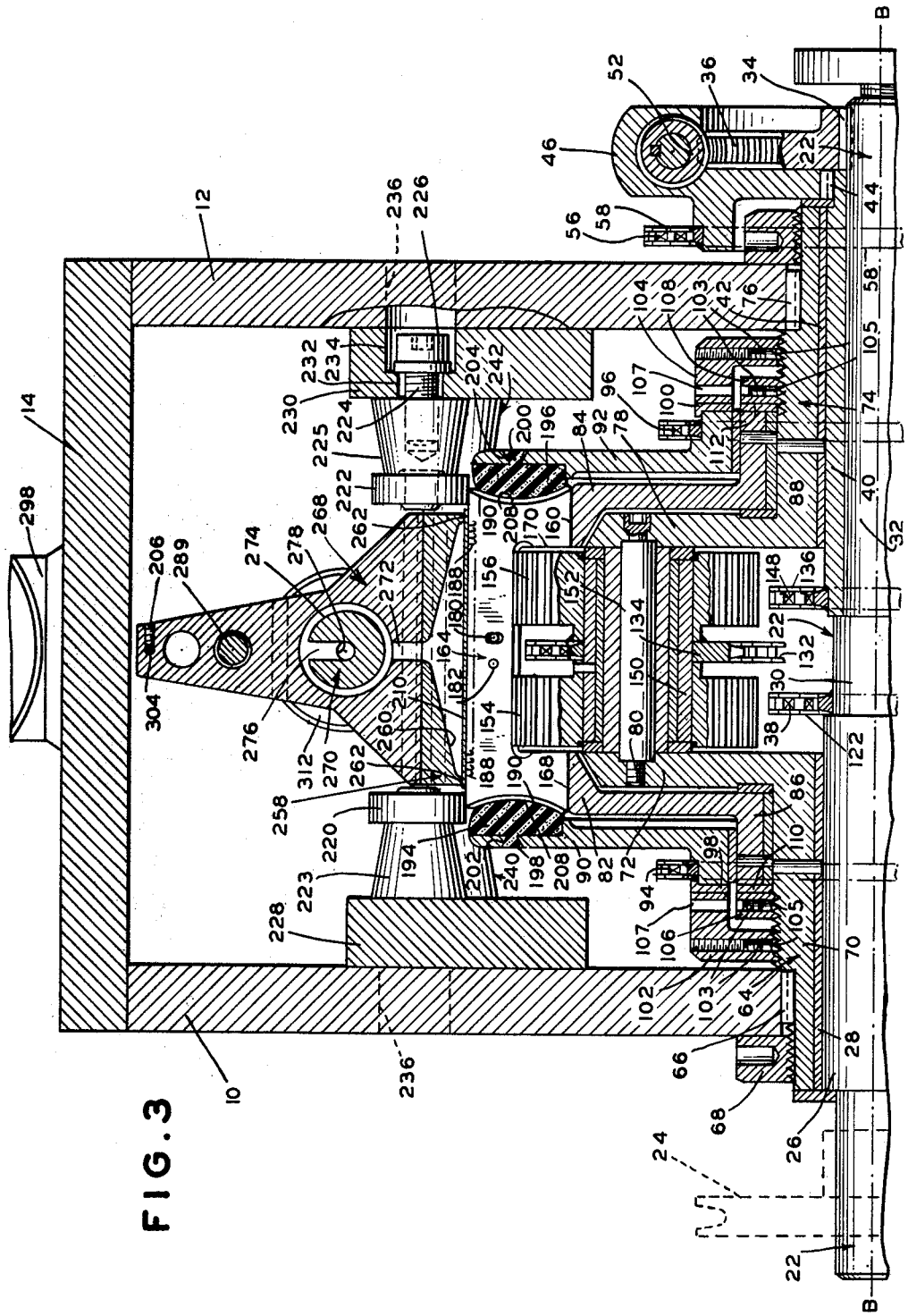
Figure 4:
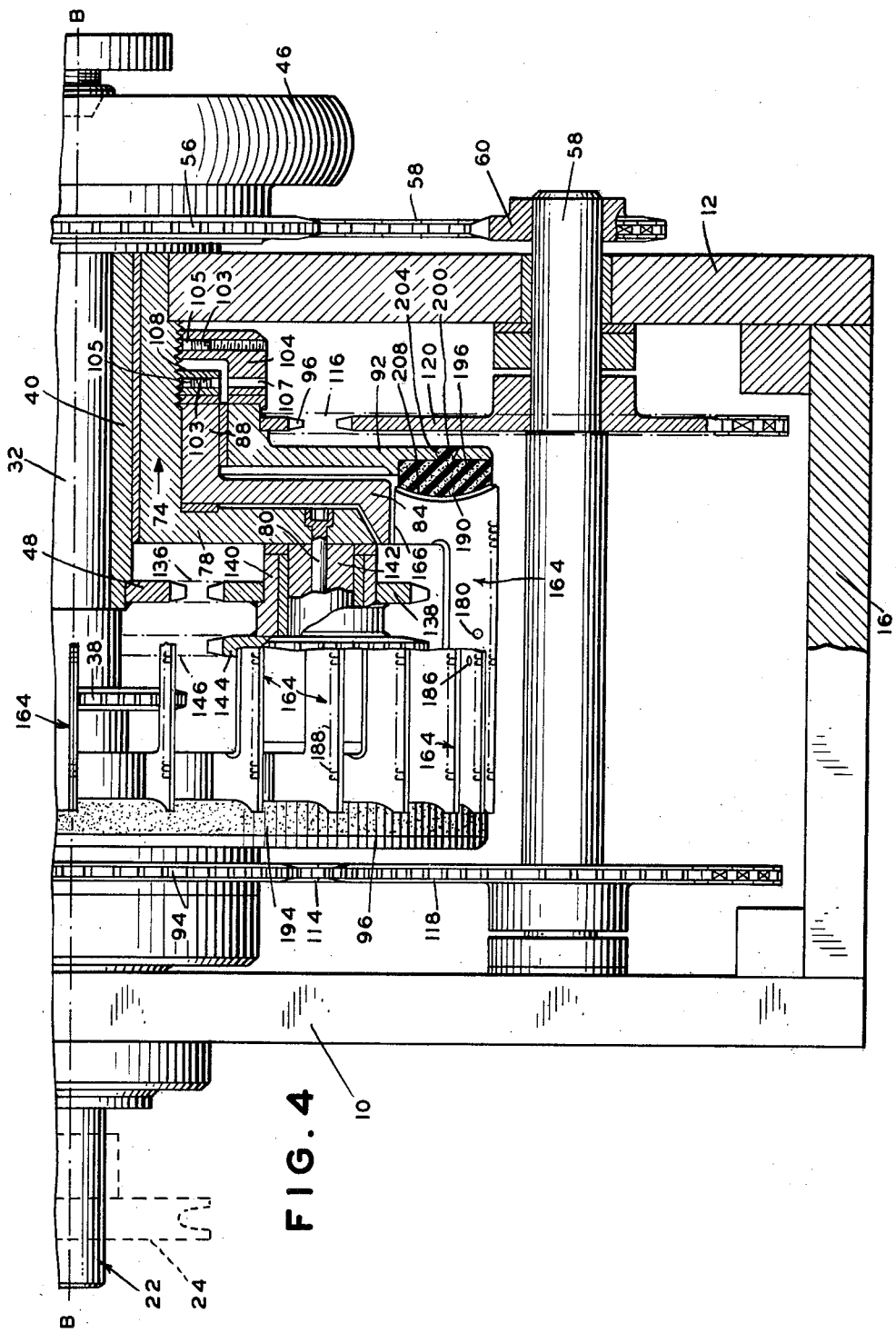

Also, in FIGS. 3 and 4 the housing 46 has secured thereto, as by welding, a sprocket 56 which through a chain 58 drives a sprocket 60 fixed upon a lower shaft 62 (FIG. 4). It will be noted that the sprocket 60 is considerably smaller in diameter than the sprocket 56 and thus will rotate at a higher speed than the main drive shaft 22 for a purpose to be described.

As shown most clearly in FIG. 3 a stator 64 is secured by a key 66 to the left-hand side plate 10. The stator 64 is thus held against rotation and it has a generally tubular body on the inner surface of which is carried the bearing 28 for the shaft 22.

The stator 64 is held in assembled relationship with respect to the side plate 10 by a nut 68 which is threaded upon the stator to bear against the outer surface of the plate 10. The stator 64 has a portion 70 of enlarged diameter to bear upon the inner surface of the plate 10 and which also is externally threaded so as to carry additional parts which it is desired to retain against rotation as will be described hereinbelow.

The stator 64 also includes at its inner end a disk portion 72 which is of substantial diameter and serves as a fixed support for several parts to be described.

A stator 74 is provided on the right-hand side of the machine as viewed in FIGS. 3 and 4 and this stator is substantially identical with the stator 64. The stator 74 which is secured by a key 76 against rotation relative to the right-hand side wall 12 carries the bearing 42 for the torque tube 40. The stator 74 also includes a disk portion 78 which is similar to the disk portion 72 just described. The disk portions 72 and 78 are secured to each other by a plurality of bolts 80 spaced circumferentially of the disks and extending from one disk to the other in directions parallel with the main drive shaft 22. Certain of the bolts 80 serve as bearing supports for rotatable elements to be described. Other bolts 80 serve primarily to rigidify the structure and thus extend through spacer tubes 81 as shown in FIG. 2.

A pair of plate supporting disks 82 and 84 (FIG. 3) having hubs 86 and 88 are respectively rotatably mounted upon the stators 64 and 74. These plate supporting disks are not directly driven but are permitted to rotate with the molding plates which they support as will be described hereinbelow. The outer diameters of the hub portions 86 and 88 of the plate supporting disks 82 and 84 serve as bearing surfaces to receive the hubs of a pair of plate return disks 90 and 92. The hub of the plate return disk 90 has fixed thereto a sprocket 94 and the plate return disk 92 has fixed on the hub thereof a sprocket 96. The hubs of the plate return disks bear respectively against thrust bearings 98 and 100 which, in turn, are supported fixed against rotation by adjustment nuts 102 and 104 respectively threaded upon the stators 64 and 74 respectively. Similar adjustment nuts 106 and 108 are provided to hold thrust bearings 110 and 112 against the hubs of the plate supporting disks 82 and 84 respectively. The adjustment nuts 102, 104, 106 and 108 may be each provided with a set screw 103 and jam plug 105 to hold them in adjusted position. Access holes 107 are formed in the nuts 102 and 104 to permit manipulation of the set screws in the nuts 106 and 108.

As shown most clearly in FIGS. 3 and 4 the sprockets 94 and 96 which drive the plate return disks, just described, are in turn driven by chains 114 and 116 and sprockets 118 and 120 respectively. The sprockets 118 and 120 are fixed to the lower shaft 62 which, it will be recalled, rotates at a substantially higher speed than the main drive shaft 22. The sprockets 94, 96, 118 and 120 are all of the same diameter whereby the plate return disks are driven at a speed of rotation substantially greater than that of the main drive shaft 22 with which the plate return disks 90 and 92 are concentric.

The sprocket 38 which is fixed to the central portion 30 of the main drive shaft 22, see FIG. 3, also see FIG. 2 in which a fragment of sprocket 38 is shown, is connected by a chain 122 to a sprocket 124 fixed, as by welding to a hub 126. Fragments only of sprocket 124 and chain 122 are shown in FIG. 1. The hub 126 is rotatably mounted upon a spacer 128 concentric with one of the bolts 80. The hub 126 also has secured thereto another sprocket 130 which is of the same diameter as the sprockets 38 and 124. As shown in FIG. 1 the sprocket 130, through a chain 132 drives another sprocket 134 of equal diameter. The sprockets 130 and 134 are on the center line of the machine as viewed in FIGS. 3 and 4 and thus are shown in full lines in FIGS. 1 and 2.

The sprocket 48 (FIG. 3) which is secured for rotation with the torque tube 40 drives through chain 136 a sprocket 138 (see FIG. 4) fixed to a hub 140 which is mounted for rotation upon a spacer 142 positioned upon one of the bolts 80. The hub 140 also has fixed thereon a sprocket 144 which is effective through chain 146 to drive a sprocket 148 shown in FIG. 1. The sprockets 138 and 148 are on the center line of the machine as viewed in FIGS. 3 and 4 and thus are shown in full lines in FIGS. 1 and 2.

Referring now to FIG. 1, it will be observed that both of the sprockets 134 and 148 are shown whereas in FIG. 3 the sprocket 148 has been omitted as a result of the irregular section line upon which FIG. 3 is taken. However, referring primarily to FIGS. 1 and 2, and bearing in mind that all of the sprockets in the train 38, 124, 130 and 134 as well as in the train 48, 138, 144 and 148 are of the same diameter, the two terminal sprockets 134 and 148 are driven at the same speed of rotation but through different driving trains. Thus the sprocket 134 is driven through a train originating with the sprocket 38 fixed to the main drive shaft 22, while the sprocket 148 is driven through a train which originates with the sprocket 48 fixed to the torque tube 40. As described hereinabove the worm 52 and wheel 36 may be adjusted so as to change the angular relationship between the originating sprockets 38 and 48.

Referring now to FIG. 3, the sprocket 134 is fixed as by welding to a hub 150 rotatable upon a spacer 152 carried by one of the bolts 80. The hub 150 also has fixed thereto on opposite sides of the sprocket 134 a relatively wide gear 154 and another relatively wide gear 156. Thus, rotation imparted to the sprocket 134 by the driving train described above will impart rotation to the gears 154 and 156. Referring now to FIG. 1, it will be observed that the sprocket 148 is fixed to a hub 158 rotatable upon a spacer 160 upon another bolt 80. The hub 158 also has fixed thereto a gear 162 and another gear (not shown) which corresponds with the gear 156 just described in connection with FIG. 3. The two sets of gears just described are for the purpose of engaging appropriate configurations on a series of mold-forming plates to drive the plates progressively through the machine and the adjustment of angular relationship between the two sets of gears is for the purpose of pressing all of the mold-forming plates into a firm, progressively moving "stack" as will be described hereinbelow. The rotation imparted to the gears just mentioned is in a clockwise direction as indicated by arrows in FIG. 1.

Referring to FIGS. 7, 8 and 9, there is shown in detail a particular form of mold-forming plate adapted for use in this invention, while in FIGS. 10 and 11 there is shown another form of plate. The two forms of plates herein shown are stacked alternately as shown in FIG. 1 so as to form between them a rack-like construction having teeth which will mesh with the teeth upon the gears 162, 154 and 156.

The mold-forming plate 164 shown in FIG. 7 is provided with lower edges 166 and 168 which are adapted to rest, when in operative position as shown in FIG. 3, upon the outer periphery of the plate supporting disks 82 and 84. The plate 164 is provided with a recess 170 having a horizontally extending portion 172 which is milled throughout its length in the form of a gear tooth as shown in detail in FIG. 8. It will be observed that another plate 178 shown in FIGS. 10 and 11 has a horizontally extending portion 176 in a corresponding recess which may be cut off flat in a horizontal plane corresponding with the base of the gear tooth conformation 172 provided in the plate 164. Thus when plates 164 and 178 are arranged in a closely packed stack in alternate relationship the surfaces 172 and 176 will form a rack-like conformation adapted to mesh with the gears 154, 156 and 162 as shown in FIG. 12, as well as in FIG. 1. It will be understood that a relatively large number of alternately arranged plates 164 and 178 will be provided so that they will continuously maintain a solid stack between the driving gears. In the form of machine just described the plates are conducted through a path which is generally circular and in the molding zone which lies between the driving gears the plates are designed to fit closely together forming a substantially solid body which constitutes an arc of the circular path in this zone. Thus each plate is tapered as shown in FIGS. 8, 11 and 12 to accurately form a small segment of the arcuate body.

Obviously the degree of taper imparted to the plates 164 and 178 depends upon the curvature of the arcuate path. For simplicity of construction it is preferred to utilize a structure similar to that illustrated in the drawings wherein the plates are carried around a circular return path and wherein they form an arcuate structure at the time they are pressed together to form the injection mold. However, it will be understood that the return path may be other than circular, and that the plates may be squeezed together into a body of non-circular form. For example, if the plates are not tapered they may be pressed into a rectangular stack with appropriate provisions for moving the stack in a rectilinear path.

It may be desirable, although not essential, that some positive means be provided in addition to the resilient means described below for assuring registry of succeeding plates with one another. Accurate registry laterally of the plate path may be particularly important when there are cavities in mating plate surfaces which must register to form accurate injection-molded bodies. For example, the plate 164 shown in FIG. 7 and all of the plates identical thereto may be provided with a vertically elongated slot or hole 180 adjacent the center line of the plate and with a tapered pin 182 extending outwardly from another point adjacent the center line of the plate. The plate 178 shown in FIG. 10 and all of the other plates having this construction is provided with a tapered pin 184 so positioned as to enter the hole 180 in a plate 164 and a hole 186 which is so positioned as to receive a pin 182 from a plate 164. By tapering the pins 182 and 184 as shown, or by equivalent tapering of the holes 180 and 186, or both, the plates 164 and 178 will be self-aligning in a lateral or horizontal direction. The maximum diameter of the pins 182 and 184 is equal to the maximum horizontal dimension of the slots or holes 180 and 186 to provide horizontal registry but the holes are elongated vertically so that the plates are free for limited movement relative to one another in a vertical direction. The pins 182 and 184 and slots or holes 180 and 182 are merely illustrative of configurations which provide for lateral registry and vertical movement between adjacent plates.

The plates 164 and 178 are provided with recessed configurations along one or both of the upper edges thereof which serve when the plates are pressed together as shown in FIG. 1 and as shown in detail in FIG. 12 to form cavities adapted to receive a moldable plastic material which is forced into the cavities as will be described hereinbelow. For the purposes of illustration, the plates 164 and 178 each have a row of cavities 188 along both upper edges which communicate with corresponding cavities on an adjacent plate to form a row of two-part molding cavities each of approximately cylindrical cross-section having a return curve therein. Thus, when the plates 164 and 178 are pressed together as in FIGS. 1 and 12, and a moldable plastic material is forced into these cavities, a row of hook-shaped plastic bodies will be formed. It will be recognized that it would be difficult, if not impossible, to remove solidified plastic material from such cavities if they were to have been formed in a one-piece mold body. However, in accordance with the present invention the plates 164 and 178 form two-part molds which may be successively separated to open the mold cavities so that extraction of the solidified hook-shaped plastic body may be readily effected.

In FIG. 7 the cavities 188 shown in a plate 164 each curve to the right and then in a return direction toward the upper edge of the plate. In the manufacture of hook-type separable fastener elements it has been found desirable to provide non-uniform orientation of the hooks in some instances. This can be accomplished in the present invention by forming some of the rows of cavities 188 to curve to the right as viewed in FIG. 7 and forming other rows to curve to the left. Also, for example, alternate cavities in some or all of the rows may curve in opposite directions instead of the uniform direction shown in FIG. 7. Also, the cavities 188 may be formed to provide hooks of differing heights or differing cross-sectional size or shape within individual rows or between rows as may be desired.

As indicated above, the hook-shaped cavities 188 shown herein are illustrative of one valuable embodiment of this invention and it will be appreciated that substantially any desired configuration may be imparted to the cavities. FIGS. 15 and 16, which will be referred to in detail below, show only two of the many configurations that may be molded in accordance with the present invention. Furthermore, it will be recognized that cavities may be formed along one side only of the upper edge of some or all of the plates 164 and 178. In that event the flat sides of such plates will cooperate with the cavities along the upper edge of the next adjacent plate to form closed cavities in which hooks, loops or other conformations may be molded each having a flat side corresponding with the flat sides of the plates. It will be recognized that precise lateral registry such as afforded by the pins 180 and 184 and holes 180 and 182 described above, is not so essential in the latter construction.

All of the mold-forming plates 164 and 178 are provided with end conformations of suitable design for cooperation with the plate return apparatus. In the illustrated embodiment of the invention, the plate return apparatus includes means which yieldably engages the ends of the plates to carry them rapidly through a return zone, slips past the ends of the plates when they are positively driven at a much slower speed through the molding zone and successively accelerates each plate as it leaves the molding zone to open each row of molding cavities at the proper time for extraction of the molded shapes from the cavities. As shown in FIG. 7, both ends of each plate 164 are curved inwardly to provide concave end edges 190. In the particular combination disclosed the edges 190 are preferably reduced in area by tapering the adjacent portions of the plate as shown at 192 in the enlarged sectional view, FIG. 9. This reduction in area permits independent cooperation between the mold-forming plates and the resilient rings described below.

The plate return apparatus includes the return discs 90 and 92 described above and, as shown in FIGS. 3 and 4, these discs are respectively provided with resilient rings 194 and 196 which are suitably secured to the inner surfaces of recesses formed in the peripheral portions of the discs 90 and 92. For example, the resilient rings 194 and 196 may be molded in situ on the discs 90 and 92 with a plurality of dove-tail keys 198 and 200 respectively, formed integrally with the rings and in a corresponding plurality of reversely tapered holes 202 and 204 respectively, spaced around the discs 90 and 92.

The resilient rings 194 and 196 are generally rectangular in cross-section, each having a convex inner face curved substantially to correspond with the concave ends of the mold-forming plates 164 and 178. The resilient rings 194 and 196 are preferably made of a resilient plastic material capable of withstanding abrasion and permanent deformation as well as the temperatures to which they may be subjected as a result of contact between the mold-forming plates and the liquid plastic material being molded in the cavities 188. For example, when molten nylon is to be injected into the cavities 188 the resilient rings 194 and 196 may be cast from a polyurethane material, such as DuPont "Adiprene L," and will give long and satisfactory service.

The resilient rings 194 and 196 serve to retain the entire complement of alternately arranged mold-forming plates 164 and 178 in the machine. The plates may be inserted or removed at some convenient point within the molding zone or return path or both upon removal of one or both of the walls 18 and 20. Illustratively, the plates may be inserted in successive groups made up of any convenient number of plates and the machine may be slowly or intermittently rotated to build up the solid stack of plates in the molding zone. In the return zone of the plate path, as shown in FIGS. 2 and 4, the plates extend, generally parallel with the axis of main drive shaft 22, between the opposed resilient rings 194 and 196. The circumferential spacing in the return zone has been shown as uniform but since the toothed plates 164 and the toothless plates 178 may not disengage in the same manner from the gears at the discharge end of the molding zone (see gear 162 in FIG. 1) the actual spacing usually is alternately wide and narrow after all of the plates have been inserted and the machine is put into operation.

The radial position of the mold-forming plates 164 and 178 in the return portion of the path is established by the rings 194 and 196 since the curved contours 190 prevent radial slippage between the plates and the rings. As shown in FIGS. 2 and 4 the diameter of the rings 194 and 196 is such that the plates 164 and 178 will be resiliently held with the lower edges 166 and 168 spaced radially away from the rims of the plate supporting discs 84 and 82 respectively. This is desirable inasmuch as the plate supporting discs 84 and 82 revolve at the relatively slow angular speed at which the mold-forming plates move through the molding zone, whereas in the major portion of the return path the plates move at the substantially higher angular speed of the plate return discs 90 and 92 to which the resilient rings 194 and 196 are secured.

The surfaces of the resilient rings 194 and 196 may be smooth, as shown, or they may be provided with shallow, smoothly formed, radial grooves to assist in preventing the plates from tilting.

Referring now to FIG. 1, a continuous length of fabric ribbon is indicated at 210 and 210A, there being an overlapped joint 212 between the portions 210 and 210A. The portion 210 represents the trailing end of one reel or spool of such ribbon, and the portion 210A represents the leading end of a new reel or spool thereof. Since the apparatus of the present invention is intended to operate continuously it is preferred to join the end of an exhausted length of fabric ribbon to the leading end of a new length. This should be done in some simple and rapid manner to avoid interrupting operation of the apparatus. For example, such ends may be joined by overlapping them and sewing them together in the overlapped area. The reels or spools as well as the apparatus for overlapping and joining the ends of the ribbon have not been illustrated inasmuch as the particular form thereof is not critical. An illustrative provision for the passage of a joint such as 212 or other irregularities in thickness of the fabric through the machine will be described at a subsequent point in this specification.

The fabric ribbon 210, 210A is continuously supplied through an opening 214 in the rear wall 18, and it is conducted beneath a roller 216 having a resilient jacket 218 of a suitable elastomer such as synthetic rubber. The roller 216 is preferably of such axial length as to extend transversely of the full width of the path of mold-forming plates 164 and 178 and the lower peripheral surface thereof is so positioned as to successively press the plates radially inwardly toward the positions they will assume as they progress through the molding zone. At the same time the fabric ribbon 210 will be pressed into engagement with the upper edges of the plates 164 and 178 and the roller 216 thus serves to draw the ribbon into the machine at the linear speed established by the movement of the plates 164 and 178 through the molding zone.

As indicated above, the total number of plates 164 and 178 is sufficient to provide a continuous build-up of the plates in a substantially solid stack from a point somewhat ahead of the molding zone. The build-up occurs as the plates successively approach the roller 216 and the operation at this point is illustrated in somewhat diagrammatic and exaggerated form in FIG. 1. Thus a firm stack of plates is shown extending counterclockwise from the upper periphery of the gear 156 to a zone generally beneath the roller 216. In the zone extending counterclockwise beyond the roller 216, successive plates 164 and 178 are first brought into contact and as they advance they are constantly urged forward by the yieldable frictional force exerted on their ends 190 by the resilient rings 194 and 196. Each plate thus adjusts itself into contact with the plate preceding it and they progressively assume proper alignment and position to engage the teeth of gear 156 (FIG. 1) and gear 154 (FIG. 3).

In those cases wherein the plates 164 and 178 are provided with interlocking devices such as the tapered pins 182 and 184, and holes 180 and 186 as shown in FIGS. 7 and 10, the behaviour of the plates as they approach the roller 216 (FIG. 1) is substantially the same as it is when the mating front and rear surfaces of the plates are smooth. Thus, when self-centering interlocking devices are provided the plates are progressively pushed down by the roller 216 toward the radial position they will occupy throughout their passage through the molding zone. While the plates are being pushed down the tapered pins of each succeeding plate are free to move vertically in the slots in the plate ahead of it but the pins may gradually enter and finally center laterally in the slots which, as described above, are a close fit in the lateral direction.

In those cases wherein the mating front and rear surfaces of the plates 164 and 178 are relatively smooth the plates may be pushed down by the roller 216 as described above and the lateral registry will be that established by the resilient rings 194 and 196. In either case the plates may be further pushed down to final position by the hold-down rolls to be described.

It is preferred to impart a finish to the mating front and rear surfaces of the plates 164 and 178 which permits percolation of air between the plates even when tightly squeezed together. This is not only facilitates separation of the plates by forces substantially normal to said surfaces as will be described below, but it also permits air to flow out of the cavities 188 when the liquid plastic material is injected into the cavities. While the surface finish should permit the flow of air it should not permit the liquid plastic to flow between the plates to form "flash" to such an extent as may be objectionable in some products. Thus, the surfaces under discussion need only to have a slightly rough finish imparted by grinding, etching, filing or other well-known procedure.

Returning to FIG. 1, the alternated plates 164 and 178 proceed from roller 216 to a point, somewhat in advance of the vertical center line of the gears 154 and 156, where the tooth conformations 172 on plates 164 progressively engage the teeth of the gears 154 and 156. At about this point the opposite end portions of the upper surfaces of each plate are successively engaged by a pair of narrow hold-down rolls 220 and 222, see FIG. 3. The rolls 220 and 222 may be made of metal and may be idlers rotatable on bearing mounts 223 and 225 secured to side frame plates 228 and 230. In FIG. 3 the right-hand side frame plate 230 has been shown in section on a vertical plane extending through the axis of the bearing mount 225. The plate 230 has a bore 232 and counterbore 234 to receive the body 224 and head 226 of a cap screw of the recessed head type for securing the bearing mount to the side plate 230. The bore and counterbore are respectively larger in diameter than the body 224 and head 226 so that the axis of the roll 222 may be adjusted radially by loosening and retightening the cap screw. An opening 236 is provided in the side wall 12 to permit access to the head 226 of the cap screw.

Similar radially adjustable bearing mounts 240 and 242 are visible in FIG. 3 and are provided for the resilient roller 216 described above and shown in section in FIG. 1. Also, as shown in FIG. 1 there are three additional hold-down rolls 244, 246, and 248 which may be identical to and mounted the same as the hold-down roll 222 described above. Like the hold-down roll 222, each of the rolls 244, 246 and 248 forms one of a pair of rolls engaging the opposite end portions of the top surfaces of the mold-forming plates 164 and 178. The other roll in each pair is not shown in the drawings but it will be understood that they are mounted for limited radial adjustment in the side frame plate 228.

All of the hold-down rolls just described are adjusted to such positions as to insure that the lower edges 166 and 168 of each mold-forming plate in the molding zone of the machine rest upon the periphery of the plate supporting discs 82 and 84. The hold-down rolls are not essential in all cases and some or all of them may be omitted particularly when the mold-forming plates are very thin and thus do not tend to move radially outwardly when squeezed together.

In FIG. 3 the plate 164 is shown pressed down against the discs 82 and 84 and it will be observed that the resilient rings 194 and 196 are distorted downwardly because they are seated in the concave ends 190 of all of the mold-forming plates in this zone of the machine. Since the resilient rings 194 and 196 are driven at an angular speed much greater than that of the plates in this zone it will be understood that the resilient rings will slip past the plates while remaining seated in the concave passageway established by the concave ends of all of the plates.

Referring again to FIG. 1, the mold-forming plates in the molding zone move clockwise beyond the last hold-down roll 248 and into engagement with the teeth of the pair of gears of which the gear 162 is a member. As explained above, the drive train for the latter pair of gears is so adjusted relative to the drive train for the pair of gears 154, 156 as to tightly squeeze the mold-forming plates 164 and 178 extending between the pairs of gears. A stripping roller 250 is secured to the side frame plates 228 and 230, preferably by adjustable bearing mounts similar to the mount 225 described above. The stripping roller 250 extends across the full width of the molding plates with its axis of rotation on a center line 252 which passes through the axis of rotation of the gear 162 and a point on the periphery of gear 162 which is approximately the point of common tangency between said periphery and the curve defined by the tooth conformations 172 of the mold-forming plates 164. The stripping roller 250 is so radially positioned as to press upon the fabric strip 210 and to hold the mold-forming plates in engagement with the gear 162 up to the center line 252. As each mold-forming plate 164 or 178 passes clockwise beyond the center line 252 it begins to respond to the urge of the resilient rings 196 and 194 to move radially outwardly and to move clockwise at a higher speed. Thus, as permitted by the receding curvature of the stripping roll 250 and the progressive release from engagement with the teeth of gear 162, each mold-forming plate will move individually away from the succeeding plate to open the mold cavities 188 sufficiently for extraction of the molded shapes in such cavities. The completed molded product 254 is guided upwardly around a portion of the periphery of the stripping roll and out through an opening 256 in front wall 20 to suitable reeling or other packaging equipment, not shown.

A typical pattern of movements and relative positions of the plates 164 and 178 as they separate from each other and from the gear 162 is indicated in simplified and exaggerated form in FIG. 1. The important aspect of such pattern is that each plate tilts or moves bodily, or both, with respect to the succeeding plate to open the mold cavities 188 just beyond the center line 252. Since, as explained above, the separation is caused by the forces frictionally applied to the concave ends of the plates by the resilient rings 194 and 196 the precise pattern of movement is primarily dependent upon the ratio between the surface speed of the resilient rings and the speed of the plates taken in conjunction with the amount of lateral pressure yieldably exerted by the resilient rings upon the ends of the plates. The speed ratio may be any reasonable arbitrary value chosen primarily to reduce the density and thus the number of plates in the return portion of the path. A ratio of 10:1 is employed in the particular machine disclosed herein, but this is merely illustrative. The amount of transverse pressure exerted on the ends of the plates by the resilient rings 194 and 196 may be adjusted by rotation of the nuts 102 and 104 (FIG. 3). In a typical embodiment of the present invention the mold-forming plates 164 and 178 may have a thickness at the top edge of about 0.05 inches and a width overall of about 4.75 inches to form a molded ribbon somewhat more than 3.0 inches wide. It will be appreciated that the amount of transverse pressure required to carry and control such plates is very small and that delicate adjustment of the nuts 102 and 104 will be effective to establish desired patterns of movement of the plates as they enter the molding zone at roller 216 (FIG. 1), and as they leave such zone at the stripping roller 250.

The nuts 102 and 104 may also be backed off to reduce deformation of the resilient rings 194 and 196 when the machine is not in operation as well as to facilitate insertion or removal of a set of mold-forming plates. Also, the rollers 216 and 250, and the hold-down rolls 244, 246, 248 etc. may be adjusted or removed as desired when changing plates. In each instance it may be necessary to readjust the angular relationship between the plate driving gears 156 and 162 to establish the desired degree of squeeze upon the plates in the molding zone.

A preferred form of apparatus for supplying a liquid moldable plastic material under pressure sufficient to inject the plastic through the fabric ribbon 210 and into mold cavities 188, is shown in FIGS. 1 and 3. Such apparatus includes a nozzle 258 having an orifice 260 (see FIG. 3) in the form of a narrow slot extending transversely of the path of the stack of mold-forming plates 164 and 178 for substantially the full width of the rows of cavities 188, and terminating at its opposite ends in lips 262 which bear upon the marginal edges of the fabric ribbon 210. The nozzle 258 also has lips 264 and 266 parallel with the length of orifice 260 (FIG. 1) which preferably are curved to conform to the curvature of the contiguous upper surfaces of the mold-forming plates. Thus, the nozzle 258 may be pressed firmly against the upper surface of the fabric 210 to confine the flow of liquid plastic material to flow continuously through the fabric as the latter moves progressively beneath the orifice 260. Preferably the narrow dimension of the orifice 260 is slightly greater than the diameter of the individual openings into the mold cavities 188, whereby all of the cavities in each successive row will be briefly opened to the orifice 260 to receive, through the interstices of the fabric 210, rapid and complete injection of the liquid plastic material.

While the nozzle 258 may be mounted in any manner suitable for the particular product to be manufactured, the apparatus illustrated includes specific features which are desirable for the manufacture of products incorporating a fabric ribbon which may have along its length occasional flaws, such as thickened or knotted yarns, or splices, such as the splice 212 illustrated in FIG. 1. To this end the nozzle 258 is secured to a carrier 268 slidably mounted upon a horizontally extending feed tube 270. As shown in solid lines in FIG. 3, the orifice 260 of the nozzle 258 is adapted to communicate, through an opening 272 in the carrier 268, with an annular passageway 274 formed in the exterior surface of feed tube 270 (see FIG. 3). The passageway 274, in turn communicates through a radial passageway 276 with the longitudinally extending passageway 278 formed in the feed tube 270. The feed tube 270 extends through the rear wall 18 of the machine enclosure (FIG. 1) and is provided with a flange 280 which is designed to be secured to the outlet of any suitable form of extruder (not shown). Extruders having a wide range of capacities in terms of quantity, temperature and pressure of output of various molten plastic materials are readily available in the market. For the illustrated embodiment of apparatus and product, an extruder for use with nylon and of modest output and pressure capacity will be adequate for the continuous production of a molded ribbon product such as 254 at a commercially practical rate.

At its inner, or right-hand end as viewed in FIG. 1, the feed tube 270 is supported in a housing 282 which is suspended from the top plate 14 as by screws 284. The housing 282 includes a recess 286 having bearings to receive a shaft 288 aligned with the longitudinal axis of the feed tube 270. The shaft is held axially by collars 290 and 292, and has a sprocket 294 secured to it within the recess 286. A sprocket chain 296 engages the sprocket 294 and extends upwardly through a suitable opening in the plate 14 to engage a sprocket (not shown) upon the drive shaft of a motor 298 secured to the plate 14. The motor 298 is an instantly reversible type.

The shaft 288 is provided with a threaded portion 289 which is received in a threaded opening formed in the nozzle carriage 268. Upon energization of the motor 298 the shaft 288 will be rotated in one direction or the other, whereby to slide the carriage 268 relative to the feed tube 270 between a position indicated in full lines in FIG. 1, and a position indicated in broken lines in FIG. 1. Limit switches 300 and 302 are secured on the rear and front edges respectively of the top plate 14, and an actuator bar 304 is adjustably secured to the carriage 268 as by a set screw 206. The actuator bar is so positioned as to engage the switch 300 when the carriage is in the full line position and to engage the switch 302 when it is in the broken line position. The switches 300 and 302 are connected to the motor 298 through relays (not shown) which are effective to reverse the motor when it is again energized.

In FIG. 1 the nozzle 258 is shown in operative relation in full lines, and the orifice 260 is positioned to discharge liquid plastic material through the fabric ribbon 210 and into the cavities 188 of the plates 164 and 178 just after the plates have passed the first driving gear 156. This position is just beyond the highest point in the curvature of the plate path so that the nozzle may move to the right as viewed in FIG. 1, and in so doing the lips of the nozzle will move away from the downwardly curving plate path. Thus, when the nozzle reaches the limit position indicated in broken lines in FIG. 1, there is a substantial vertical clearance between the nozzle lips and the fabric 210. A sensing switch 306 is positioned just ahead of the nozzle 258 and is arranged to press upon the upper surface of the fabric ribbon 210. When a splice 212 or other bump in the ribbon 210 reaches the switch 306, the motor 298 is energized to move the nozzle and carriage 268 forward from the operative, full line position, to the inoperative, broken line position to permit the splice or bump to pass. When the splice or bump reaches another sensing switch 308 the motor 298 is again energized to return the nozzle and carriage to operative position.

A feature of the mechanism just described is the provision for shutting off the flow of plastic material when the nozzle 258 is moved away from operative position. To this end the passageway 272 in the carriage 268 has approximately the same dimension axially of the feed tube as the annular passageway 274 in the feed tube, and these passageways are aligned only when the nozzle 258 is in operative position. As soon as the nozzle starts to move toward inoperative position the annular passageway 274 is shut off and the molten plastic material within the nozzle orifice 260 assumes a condition of the hydraulic balance in which it will not tend to flow from the nozzle.

Provision is made for maintaining the plastic at proper temperature to remain molten in the feed tube 270, carriage 268 and nozzle 258. Thus, a heating coil 310 is shown surrounding the feed tube 270, and similar coils 312 and 314 are shown on the carriage 268. Also, cartridge-type heaters 316 and 318 are strategically located within the carriage 268 and the nozzle 258. The cartridge heaters 318 are especially desirable to insure that the plastic material in the nozzle orifice 260 remains molten at all times including those periods in which the nozzle may be moved to inoperative position as described above.

While the temperature of molten nylon is relatively high, the amount which is impregnated into the fabric 210 and is injected into the cavities is very small compared with the mass of the stack of mold-forming plates 164 and 178 within the molding zone. It is preferred that the plates be made of a metal such as beryllium copper which absorbs and dissipates heat at a very high rate. Thus, if the plates are relatively cool as they enter the molding zone they will rapidly absorb heat from the molten plastic bringing it down to the point of solidification as it moves toward the stripping roll 250. The plates 164 and 178 thereafter are separated, as described above, and are free to cool as they are carried around the return portion of their path.

Although not shown in the drawings, the apparatus is preferably supplied with an air circulating means to enhance cooling of the mold-forming plates 164 and 178. To this end the entire apparatus may be enclosed in a housing to which relatively cool filtered air is constantly supplied at a gaseous pressure somewhat above atmospheric. Such air will escape through openings such as the exit 256 for the completed product 254, and will serve the further purpose of constantly excluding atmospheric contaminants of either solid or gaseous nature.

It will be recognized that the production rate of the apparatus is limited primarily by the amount of time required for the molten plastic material to solidify sufficiently to permit stripping from the mold. The cooling air referred to above may be refrigerated to increase the rate of heat transfer from the mold-forming plates and other parts of the apparatus to increase the production rate or to compensate for larger quantities of molten nylon which may be required for the manufacture of thicker ribbons or larger injection-molded conformations. Similarly, provision may be made for circulation of liquid coolants in parts of the machine which come in contact with the mold-forming plates or with the molded product.

Referring now to FIG. 13 the product 254 is shown as comprising the fabric base 210 with closely spaced rows of hooks 320 which have been molded in the cavities 188 of the mold-forming plates as described above. Since, as shown in FIG. 3 the longitudinal edges of the fabric 210 extend laterally beneath the lips 262 of the nozzle 258 the product shown in FIG. 13 has longitudinal edge portions 322 and 323 which are devoid of hooks and which have not been impregnated with the plastic material from which the hooks 320 are formed. These edge portions 322, 323 have served, while confined beneath the nozzle lips 262 to restrict lateral flow of the liquid plastic material because the longitudinal yarns or warps of the fabric serve as natural barriers to such flow. Therefore, the edge portions 322, 323 of the product 254 will be devoid of plastic material except in relatively narrow bands corresponding with the nozzle lips 262.

The longitudinal edge portions 322, 323 may be trimmed off, is desired. This may be done with great precision and in a simple manner by providing slitting knives adapted to work against the stripping roller 250. In The knife 324 serves to trim the edges 322 from the mounted on a shaft 326 and having a sharpened edge bearing against the surface of the stripper roller 250. The knife 324 serves to trim the edges 322 from the product 254 in a continuous fashion. A similar knife (not shown) may be provided for the edge 323. Also, similar knives may provide to slit the product 254 into a plurality of narrow ribbons if so desired.

Referring now to FIG. 14 which is greatly enlarged and somewhat diagrammatic, the fabric 210 is shown as comprising warp yarns 328 alternately above and below a weft yarn 330 as is customary in a plain weave fabric. The solidified nylon 322 is shown as a substantially continuous body extending through all of the openings between the yarns 328 and 330 and having relatively smooth upper and lower surfaces 334 coinciding generally with the corresponding surfaces of the warp yarns 328. The hooks 320 are integral with the solidified nylon body 322 and each hook is provided with a smoothly rounded fillet 336 to increase the strength and durability of the juncture between the base of the hook and the body 332. The fillets 336 have been formed as a result of the preferred configuration of the cavities 188 as shown in FIG. 12 in which the opening of each cavity 188 into the upper surface of the mold-forming plate is smoothly flared.

The strength and durability of the juncture at the base of each hook 320 may be further enhanced by the use of a fabric ribbon 210 in which the yarns are rather fuzzy, having hair-like fibers 338 which will be swept by the flow of molten plastic material through the fabric 210 into the cavities 188 to concentrate, as shown in FIG. 14, within the region of the juncture. Most of the fibers 338 which enter into the base portion of the hooks will remain attached to the yarns of which they are a part and will thus add substantially to the strength of the juncture between the hooks and the base fabric.

In FIGS. 15 and 16 there are shown some modifications of the product which may be produced by the apparatus described above with suitable alteration of the mold cavities 188. These modifications are merely illustrative of the many pile-like products which the present invention makes it possible to produce in a continuous form. In FIG. 15 the base fabric 410 is impregnated with a solidified body 432 of nylon or other suitable plastic material which is integrally formed with long, thin bristles or pile-like bodies 420. The juncture between the bodies 420 and the body 432 may be provided with fillets 436 and reinforced by fibers 438 all as described above in connection with FIG. 14.

In FIG. 16 bristles or pile-like bodies 520 having enlarged portions or knobs 522 at their extremities are shown. These bodies 520 are characteristic of conformations which may be readily stripped from the two-part molds provided by the separable mold-forming plates 164 and 178 described above. In this modification the juncture between the bodies 520 and the body 532 of solidified plastic in which the base fabric 510 is embedded may be provided with fillets 536 and reinforced by fibers 538 described above in connection with FIG. 14.

While the above detailed description has been directed to an embodiment of the present invention in which a molten plastic material is utilized it will be recognized that other settable liquid plastics may be used with suitable modification of the apparatus. Thus, by using a pressure feeder arranged to mix constituents at some suitable point, a resin and a setting agent may be mixed and discharged with or without heating, through the nozzle 258 while still liquid. Setting of the resin may be so timed as to be sufficiently advanced to permit stripping of the product from the mold-forming plates at the stripping roll 250 as described above in connection with the products made from nylon or similar materials.

The use of a fabric ribbon or other perforate or porous base 210 as described above is particularly desirable for the reasons already set forth in connection with many of the products capable of being produced by the apparatus of the present invention. For many such products the base ribbon may serve additional purposes. For example, it may be colored for esthetic or identification purposes, or it may be imprinted to display trademarks, instructions and the like.

For products in which the base ribbon 210 may not be necessary or desirable provision may be made for forming a plastic film on the surface afforded by the closely packed plates 164 and 178 concurrently with the injection of the plastic material into the cavities formed in the plates. In that event the nozzle or the mold-forming plates or both would be modified to provide for the metering of a film of desired thickness with appropriate provision for sealing against unwanted leakage and for containing the film until it solidifies. The specific design of such a modified nozzle would also be affected by the particular plastic material selected for use.

What is claimed is:

1. In an apparatus for continuously forming a plurality of injection molded plastic objects, the combination of a plurality of separate mold forming bodies each having a pair of opposed end walls, a top wall and front and front and rear side walls intersecting said top wall to form front and rear edges, and at least some of said bodies having formed along at least one of said edges a plurality of injection mold forming recesses each of which opens from said edge into the top wall of said body and opens from said edge into the contiguous side wall of said body, means for driving said bodies successively through a closed path, said driving means including first driving means yieldably and frictionally engageable with said opposed end walls of each of said bodies throughout the length of said closed path and second driving means positively engageable with at least some of said bodies and effective in a predetermined portion of said closed path for pressing a substantial number of successively disposed bodies firmly against one another in the direction of movement of said bodies through said portion of said closed path with the front wall of each body pressed into face to face engagement with the rear wall of the body immediately ahead thereof whereby said recesses are closed off to form throughout said portion of said path rows of injection mold cavities between said bodies and open only into top wall surfaces of said bodies, pressure means for injecting at a predetermined point in said portion of said path a moldable plastic material into the successive rows of injection mold cavities as said mold forming bodies move past said predetermined point, and said first driving means being effective for separating said mold forming bodies to successively open each row of injection molding cavities for withdrawal from said mold forming recesses of the solidified plastic objects therein.

2. The apparatus as set forth in claim 1 wherein said moldable plastic material is molten nylon and said pressure means includes heating means for maintaining said nylon in molten condition.

3. In an apparatus for continuously forming a plurality of injection molded plastic objects, the combination of a plurality of separate mold forming bodies each having a pair of opposed end walls, a top wall and front and rear side walls intersecting said top wall to form front and rear edges, said bodies having formed along said edges a plurality of injection mold forming recesses each of which opens from said edge into the top wall of said body and opens from said edge into the contiguous side wall of said body, the recesses along the front edges of said bodies being complementary to the recesses along the rear edges of said bodies, means for driving said bodies successively through a closed path, said driving means including first driving means yieldably and frictionally engageable with said opposed end walls of each of said bodies throughout the length of said closed path and second driving means positively engageable with at least some of said bodies and effective in a predetermined portion of said closed path for pressing a substantial number of successively disposed bodies firmly against one another in the direction of movement of said bodies through said portion of said closed path with the front wall of each body pressed into face to face engagement with the rear wall of the body immediately ahead thereof whereby said complementary recesses are registered with each other and are closed off to form throughout said portion of said path rows of injection mold cavities between said bodies and open only into top wall surfaces of said bodies, pressure means for injecting at a predetermined point in said portion of said path a moldable plastic material into the successive rows of injection mold cavities as said mold forming bodies move past said predetermined point, and said first driving means being effective for separating said mold forming bodies to successively open each row of injection molding cavities for withdrawal from said mold forming recesses of the solidified plastic objects therein.

4. In an apparatus for continuously forming a ribbon comprising a molded plastic material and said ribbon having a plurality of protuberances molded integrally with said plastic material, the combination of a plurality of separate mold forming bodies each having a pair of opposed end walls, a top wall and front and rear side walls intersecting said top wall to form front and rear edges, and at least some of said bodies having formed along at least one of said edges a plurality of injection mold forming recesses each of which opens from said edge into the top wall of said body and opens from said edge into the contiguous side wall of said body, means for driving said bodies successively through a closed path, said driving means including first driving means yieldably and frictionally engageable with said opposed end walls of each of said bodies throughout the length of said closed path and second driving means positively engageable with the least some of said bodies and effective in a predetermined portion of said closed path for pressing a substantial number of successively disposed bodies firmly against one another in the direction of movement of said bodies through said portion of said closed path with the front wall of each body pressed into face to face engagement with the rear wall of the body immediately ahead thereof whereby said recesses are closed off to form throughout said portion of said path rows of injection mold cavities between said bodies and open only into top wall surfaces of said bodies, pressure means adapted to continuously supply a moldable liquid plastic material, a nozzle communicating with said pressure means, means for holding said nozzle with said orifice in communication with the injection molding cavities which are moving past said predetermined point, whereby the plastic material discharged by said nozzle is forced into the successive rows of injection mold cavities as said mold forming bodies move through said predetermined portion of said path, and said first driving means being effective for separating said mold forming bodies at the end of said predetermined portion of said path to successively open each row of injection molding cavities for withdrawal from said mold forming recesses of the solidified plastic protuberances therein.

5. In an apparatus for continuously forming a plurality of injection molded plastic objects, the combination of a plurality of separate mold forming bodies each having a pair of opposed end walls, a top wall and front and rear side walls intersecting said top wall to form front and rear edges, and at least some of said bodies having formed along at least one of said edges a plurality of injection mold forming recesses each of which opens from said edge into the top wall of said body and opens from said edge into the contiguous side of said body, means for driving said bodies successively through a closed path, said driving means including first driving means yieldably and frictionally engageable with said opposed end walls of each of said bodies throughout the length of said closed path to urge said bodies to move throughout said predetermined path at a first predetermined speed and second driving means positively engageable with at least some of said bodies and effective in a predetermined portion of said closed path for driving said bodies at a second predetermined speed substantially slower than said first predetermined speed and for pressing a substantial number of successively disposed bodies firmly against one another in the direction of movement of said bodies through said portion of said closed path with the front wall of each body pressed into face to face engagement with the rear wall of the body immediately ahead thereof whereby said recesses are closed off to form throughout said portion of said path rows of injection mold cavities between said bodies and open only into top wall surfaces of said bodies, pressure means adapted to continuously supply a moldable liquid plastic material, a nozzle having an elongated narrow orifice communicating with said pressure means, means for holding said nozzle with the lengthwise dimension of said orifice extending transversely of the path of movement of said bodies at a predetermined point in said portion of said path with said orifice in communication with the injection molding cavities which are moving past said predetermined point, whereby the plastic material discharged by said nozzle is forced into the successive rows of injection mold cavities as said mold forming bodies move through said predetermined portion of said path, and said first driving means being effective for individually and successively accelerating said mold forming bodies at the end of said predetermined portion of said path to successively open each row of injection molding cavities for withdrawal from said mold forming recesses of the solidified plastic objects therein.

6. In an apparatus for continuously forming a continuous length of ribbon useful as a separable fastener element, said ribbon comprising a molded plastic material and having a plurality of pile-like hook shaped protuberances projecting from one surface of said ribbon and molded integrally with said plastic material, the combination of a plurality of separate mold forming bodies each having a pair of opposed end walls, a top wall and front and rear side walls intersecting said top wall to form front and rear edges, and at least some of said bodies having formed along at least one of said edges a plurality of hook shaped injection mold forming recesses each of which opens from said edge into the top wall of said body and opens from said edge into the contiguous side wall of said body, means for driving said bodies successively through a closed path, said driving means including first driving means yieldably and frictionally engageable with said opposed end walls of each of said bodies throughout the length of said closed path to urge said bodies to move throughout said predetermined path at a first predetermined speed and second driving means positively engageable with at least some of said bodies and effective in a predetermined portion of said closed path for driving said bodies at a second predetermined speed substantially slower than said first predetermined speed and for pressing a substantial number of successively disposed bodies firmly against one another in the direction of movement of said bodies through said portion of said closed path with the front wall of each body pressed into face to face engagement with the rear wall of the body immediately ahead thereof whereby said recesses are closed off to form throughout said portion of said path rows of hook shaped injection mold cavities between said bodies and open only into top wall surfaces of said bodies, pressure means adapted to continuously supply a moldable liquid plastic material, a nozzle having an elongated narrow orifice communicating with said pressure means, means for holding said nozzle with the lengthwise dimensions of said orifice extending transversely of the path of movement of said bodies at a predetermined point in said portion of said path with said orifice in communication with the injection molding cavities which are moving past said predetermined point, whereby the plastic material discharged by said nozzle is forced into the successive rows of injection mold cavities as said mold forming bodies move through said predetermined portion of said path, and said first driving means being effective for individually and successively accelerating said mold forming bodies at the end of said predetermined portion of said path to successively open each row of injection molding cavities for withdrawal from said mold forming recesses of the solidified hook shaped plastic protuberances therein.

7. In an apparatus for continuously forming a continuous length of ribbon useful as a separable fastener element, said ribbon comprising a molded plastic material and having a plurality of pile-like hook shaped protuberances projecting from one surface of said ribbon and molded integrally with said plastic material, the combination of a plurality of separate mold forming bodies each having a pair of opposed end walls, a top wall and front and rear side walls intersecting said top wall to form front and rear edges, said bodies having formed along said edges a plurality of hook shaped injection mold forming recesses each of which opens from said edge into the top wall of said body and opens from said edge into the contiguous side wall of said body, the recesses along the front edges of said bodies being complementary to the recesses along the rear edges of said bodies, means for driving said bodies successively through a closed path, said driving means including first driving means yieldably and frictionally engageable with said opposed end walls of each of said bodies throughout the length of said closed path to urge said bodies to move throughout said predetermined path at a first predetermined speed and second driving means positively engageable with at least some of said bodies and effective in a predetermined portion of said closed path for driving said bodies at a second predetermined speed substantially slower than said first predetermined speed and for pressing a substantial number of successively disposed bodies firmly against one another in the direction of movement of said bodies through said portion of said closed path with the front wall of each body pressed into face to face engagement with the rear wall of the body immediately ahead thereof whereby said complementary recesses are registered with each other and are closed off to form throughout said portion of said path rows of hook shaped injection mold cavities between said bodies and open only into top wall surfaces of said bodies, pressure means adapted to continuously supply a moldable liquid plastic material, a nozzle having an elongated narrow orifice communicating with said pressure means, means for holding said nozzle with the lengthwise dimensions of said orifice extending transversely of the path of movement of said bodies at a predetermined point in said portion of said path with said orifice in communication with the injection molding cavites which are moving past said predetermined point, whereby the plastic material discharged by said nozzle is forced into the successive rows of injection mold cavities as said mold forming bodies move through said predetermined portion of said path, and said first driving means being effective for individually and successively accelerating said mold forming bodies at the end of said predetermined portion of said path to successively open each row of injection molding cavities for withdrawal from said mold forming recesses of the solidified hook shaped plastic protuberances therein.

8. The apparatus as set forth in claim 7 wherein said moldable liquid plastic material is molten nylon and said pressure means includes heating means for maintaining said nylon in molten condition for discharge from said nozzle.

9. In an apparatus for continuously forming a continuous ribbon having a base sheet comprising a strip of porous flexible material impregnated with a molded plastic material and said ribbon having a plurality of pile-like formations projecting from one surface of said base sheet and said pile-like formations being molded integrally with the plastic material in said base sheet, the combination of a plurality of separate mold forming bodies each having a pair of opposed end walls, a top wall and front and rear side walls intersecting said top wall to form front and rear edges, at least some of said bodies having formed along at least one of said edges a plurality of injection mold forming recesses each of which opens from said edge into the top wall of said body and from said edge into the contiguous side wall of said body and each said recess being so shaped that a solidified object molded therein may be removed intact therefrom through said openings in said side walls, means for driving said bodies successively through a closed path, said driving means including first driving means yieldably and frictionally engageable with said opposed end walls of each of said bodies throughout the length of said closed path to urge said bodies to move throughout said predetermined path at a first predetermined speed and second driving means positively engageable with at least some of said bodies and effective in a predetermined portion of said closed path for driving said bodies at a second predetermined speed substantially slower than said first predetermined speed and for pressing a substantial number of successively disposed bodies firmly against one another in the direction of movement of said bodies through said portion of said closed path with the front wall of each body pressed into face to face engagement with the rear wall of the body immediately ahead thereof whereby said recesses are closed off to form rows of injection mold cavities, and said edges of successive bodies being in registry so that the top walls of successive bodies form a substantially continuous surface broken only by the openings into said rows of mold cavities, first guiding means for guiding a continuous strip of porous flexible material into facewise engagement with the contiguous upper walls of said mold forming bodies near the beginning of said predetermined portion of said path for movement with said bodies through said portion of said path with the width of said strip extending transversely of said rows of injection mold cavities, pressure means adapted to continuously supply a moldable liquid plastic material, a nozzle having an elongated narrow orifice communicating with said pressure means, said nozzle having lips surrounding said orifice, means for holding said nozzle with the lengthwise dimension of said orifice extending transversely of said strip of porous flexible material and with the lips of said nozzle pressing said strip firmly against said top walls at a predetermined point within said portion of said path whereby the plastic material discharged by said nozzle is forced through said porous material and successively into the rows of injection mold cavities as said strip moves past said nozzle, second guiding means for holding said strip of material in fixed relationship with said bodies for movement therewith through a substantial distance within said predetermined portion of said path beyond said predetermined position of said nozzle to permit solidification of said plastic material in said mold forming cavities and in said porous strip, said first driving means being effective for individually and successively accelerating said mold forming bodies at the end of said predetermined portion of said path to successively separate said bodies and to open each row of mold cavities therein, and said second guiding means being effective to guide said molded ribbon away from the path of said separated mold forming bodies to successively withdraw the rows of molded pile-like formations on said ribbon from the mold forming recesses in said bodies.

10. The apparatus as set forth in claim 9 wherein said moldable liquid plastic material is molten nylon and said pressure means includes heating means for maintaining said nylon in molten condition for discharge from said nozzle.

11. The apparatus as set forth in claim 9 wherein said means for holding said nozzle includes sensing means engageable with said strip of porous flexible material at a point ahead of said nozzle responsive to the thickness of said strip, and means under the control of said sensing means for moving said nozzle out of contact with said strip and concurrently stopping the flow of moldable plastic material from said nozzle when said sensing means detects an increase of predetermined magnitude in thickness of said strip above the normal thickness thereof.

12. The apparatus as set forth in claim 11 wherein said means for holding said nozzle includes a second sensing means similar to said first sensing means and engageable with said strip of porous flexible material at a point beyond said nozzle, and means under the control of said second sensing means for returning said nozzle into contact with said strip and for resuming the flow of moldable plastic material to said nozzle when said second sensing means detects the return of the thickness of said strip to said normal thickness.

13. In an apparatus for continuously forming a plurality of injection molded plastic objects, the combination of a plurality of separate mold forming bodies consisting of relatively thin metal plates one of the narrow walls of each being a top wall and the broad faces of each being front and rear side walls intersecting said top wall to form front and rear edges, at least some of said plates having formed along at least one of said edges a plurality of injection mold forming recesses each of which opens from said edge into the top wall of said plate and opens from said edge into the contiguous side wall of said plate, each of said plates having end walls, one-half of said plurality of plates each having a bottom wall spaced vertically from its top wall by a predetermined distance and the other one-half of said plates each having a bottom wall spaced a lesser distance from its top wall, means for driving said bodies successively through a closed path with the plates from each one-half of the plurality thereof alternated, said driving means including a pair of gears spaced along said closed path each of said gears having teeth so spaced and of such conformation as to mesh with the rack-like conformation presented by the alternately high and low bottom walls of said plates, means for driving said gears at the same peripheral speed, means for setting the angular relationship between said gears in such manner that all of the plates extending between said gears in a predetermined portion of said path are pressed firmly against one another in the direction of movement of said plates and are moved at the peripheral speed of said gears as a substantially solid body with the front wall of each plate pressed into face to face engagement with the rear wall of the plate immediately ahead thereof whereby said mold forming recesses are closed off to form throughout said portion of said path rows of injection mold cavities between said plates and open only into top wall surfaces of said plates, pressure means for injecting at a predetermined point in said portion of said path a moldable plastic material into the successive rows of injection mold cavities as said plates move past said predetermined point, and said driving means including means yieldably engageable with the end walls of said plates for individually and successively accelerating said plates as the same are progressively released from the gear at the end of said predetermined portion of said path to successively open each row of injection molding cavities for withdrawal from said mold forming recesses of the solidified plastic objects therein.

References Cited by the Examiner

UNITED STATES PATENTS

| | | | |
|---|---|---|---|
| 2,282,308 | 5/42 | Dahlin | 18—20 |
| 2,288,611 | 7/42 | De Wyk | 25—99 XR |
| 2,291,545 | 7/42 | Ganz et al. | 18—59 XR |
| 2,292,366 | 8/42 | De Wyk | 18—4 |
| 2,453,223 | 11/48 | Henderson | 264—257 |
| 2,485,549 | 1/50 | Muskat | 264—257 |
| 2,686,338 | 8/54 | Morin | 18—1 |
| 2,695,419 | 11/54 | Morin | 18—1 |

OTHER REFERENCES

Serial No. 285,944, Swarovski, (A.P.C.), published April 27, 1943.

MICHAEL V. BRINDISI, *Primary Examiner.*

WILLIAM J. STEPHENSON, ALEXANDER H. BRODMERKEL, *Examiners.*

UNITED STATES PATENT OFFICE
CERTIFICATE OF CORRECTION

Patent No. 3,196,490 July 27, 1965

George H. Erb

It is hereby certified that error appears in the above numbered patent requiring correction and that the said Letters Patent should read as corrected below.

Column 10, line 18, strike out "is"; column 14, line 51, for "is" read -- if --; line 54, strike out "The knife 324 serves to trim the edges 322 from the" and insert instead -- FIG. 1 there is shown a knife 324 in the form of a wheel --; line 56, for "stripper" read -- stripping --; line 57, for "edges" read -- edge --; line 60, for "provide" read -- be provided --; column 15, line 10, after "210" insert -- and --; column 16, line 3, strike out "and front"; column 17, line 15, for "the" read -- at --; column 22, line 23, for "2,485,549" read -- 2,495,640 --.

Signed and sealed this 16th day of August 1966.

(SEAL)
Attest:

ERNEST W. SWIDER
Attesting Officer

EDWARD J. BRENNER
Commissioner of Patents